United States Patent [19]

Ethington

[11] 4,151,265
[45] Apr. 24, 1979

[54] METHOD AND APPARATUS FOR REMOVING NITROGEN OXIDES FROM A GAS STREAM

[75] Inventor: Donald Ethington, Dimmitt, Tex.

[73] Assignee: Goodpasture, Inc., Brownfield, Tex.

[21] Appl. No.: 638,043

[22] Filed: Dec. 5, 1975

Related U.S. Application Data

[63] Continuation-in-part of Ser. No. 533,196, Dec. 16, 1974, abandoned, which is a continuation-in-part of Ser. No. 455,568, Mar. 28, 1974, abandoned.

[51] Int. Cl.$^2$ .................................................. C01C 1/18
[52] U.S. Cl. ..................................... 423/396; 423/235
[58] Field of Search ................................ 423/235, 396

[56] References Cited

U.S. PATENT DOCUMENTS

| | | | |
|---|---|---|---|
| 2,102,136 | 12/1937 | Shapleigh | 423/396 |
| 3,453,071 | 7/1969 | Schmitt et al. | 423/396 X |
| 3,579,298 | 5/1971 | O'Brien et al. | 423/396 |

*Primary Examiner*—G. O. Peters

[57] ABSTRACT

A gas stream containing nitrogen oxides, such as the tail gas from a nitric acid plant, is treated to reduce the nitrogen oxides content thereof. The method results in the production of an aqueous solution of ammonium nitrate. In a liquid-gas contact apparatus, the gas stream is reacted, under steady state conditions with an aqueous solution of ammonium nitrate at a pH of about 0.1 to about 3.5. The gas stream can be further reacted with an aqueous solution of ammonium nitrate at a pH of about 7.5 to about 8.5; and thereafter with water, preferably slightly acidified. The resulting gas stream of reduced nitrogen oxides content may be safely discharged to the atmosphere without causing air pollution, the nitrogen oxides content being below imposed standards.

13 Claims, 4 Drawing Figures

METHOD AND APPARATUS FOR REMOVING NITROGEN OXIDES FROM A GAS STREAM

REFERENCE TO RELATED APPLICATION

This application is a continuation-in-part of application Ser. No. 533,196 filed Dec. 16, 1974, now abandoned which application is a continuation-in-part of application Ser. No. 455,568, filed Mar. 28, 1974, now abandoned.

BACKGROUND OF THE INVENTION

1. Field of the Invention

This invention relates to the treatment of gas streams containing nitrogen oxides; more particularly the present invention relates to a method for the treatment of such gas streams containing nitrogen oxides, particularly the tail gas from a nitric acid plant, in order to reduce or substantially eliminate the nitrogen oxides content of a gas stream while producing an aqueous ammonium nitrate solution product and to apparatus effective for the removal of a gaseous component from a gas stream.

2. Description of the Prior Art

Various industrial processes, such as the production of nitric acid and the nitration of organic compounds, produce waste gas streams containing small proportions of nitrogen oxides, principally as nitric oxide and nitrogen dioxide. Discharge of such waste gas streams into the atmosphere is highly objectionable, since the nitrogen oxides are toxic, corrosive, and act as atmosphere pollutants. Because of the pollution to the atmosphere which is caused by discharge of waste gas streams containing nitrogen oxides, limits upon the nitrogen oxides content which can be present in any industrial waste gas are set by the Environmental Protection Agency. While the allowable limits, of course, differ depending upon location and other factors, such as prevailing winds, etc., it is generally necessary to treat the industrial gas streams so that the nitrogen oxides content is at least below 600 parts per million. As a result, such waste gas streams must be treated in order to eliminate nitrogen oxides prior to discharge of the waste gas stream into the atmosphere. One typical approach is to catalytically react the waste gas stream containing nitrogen oxides with a reducing gas such as methane or hydrogen. Methane or natural gas principally consisting of methane is generally employed, due to economic considerations. The catalyst generally employed is an expensive platinum group metal such as platinum, palladium, rhodium, ruthenium, osmium or iridium, or a mixture of such metals. The catalyst may be in the form of unsupported wire mesh; however, the catalyst is generally supported on a suitable carrier such as alumina pellets, nichrome wire or silica gel. The catalytic reaction of the nitrogen oxides with the reducing gas results in the elimination of the nitrogen oxides, with the formation of free nitrogen and water vapor and/or carbon dioxide. When free oxygen is also present in the waste gas stream, as in the case of a tail gas from a nitric acid process, the free oxygen preferentially reacts with the reducing gas before reaction of the nitrogen oxides can take place. This results in a wasteful consumption of the reducing gas. A final waste gas stream substantially free of nitrogen oxides and suitable for discharge into the atmosphere is produced; however, the process is costly and wastes energy in the combustion process.

In addition to such catalytic reaction or catalytic combustion of the nitrogen oxides present in the industrial gas stream, a further typically employed method is to pass the nitrogen oxides containing industrial waste gas over a molecular sieve. While this method is effective to reduce the nitrogen oxides content, the successful adoption of this technique has been somewhat thwarted by the expensive nature of the technique, including the high operation costs when employing a molecular sieve. This is due to the fact that the molecular sieve is quickly poisoned by contaminants within the industrial waste gas stream, making regeneration of a molecular sieve a frequent occurrence. The use of the molecular sieve to reduce the nitrogen oxides content is also disadvantageous in that there are great power requirements, thereby increasing the economic disadvantages of the procedure.

In addition to the above methods which have been proposed for the removal of nitrogen oxides from an industrial waste gas stream, various chemical methods have also been proposed. These are exemplified by the urea destruction method and a method which employs an ammonium nitrate scrubbing solution. The use of urea to remove the nitrogen oxides is exemplified by a method set forth for example in U.S. Pat. No. 3,565,575 in which a gas stream containing nitrogen oxides, such as a tail gas from a nitric acid plant, is scrubbed with an aqueous urea solution. The nitrogen oxides dissolve in the solution to form nitric acid. The nitric acid reacts with the urea to form nitrogen, carbon dioxide and water. Due to the destruction of the urea in this reaction, the use of urea to remove the nitrogen oxides from an industrial waste gas stream is quite costly. As a result, this method has not been successfully practiced commercially. In addition, the removal which can be achieved by utilizing urea in this manner is not totally satisfactory.

The use of a scrubbing solution of ammonium nitrate is exemplified by U.S. Pat. No. 3,453,071. This method involves the introduction of the gas stream into an ammoniacal solution of ammonium nitrate, generally at a temperature of about 20 to 30° C. and an ammonium nitrate content greater than 30% by weight. An eight stage process is exemplified and applicability of a weakly acidic ammonium nitrate solution is described. A great disadvantage of this method is that to be effective, the molar ratio of NO to $NO_2$ must be adjusted to 1:1 prior to introduction of the gas into the ammoniacal solution of ammonium nitrate. This complicates the process and makes the same economically disadvantageous. This, coupled with the fact that the removal of nitrogen oxides is apparently somewhat less than satisfactory, has lead to the conclusion that this process cannot be conducted satisfactorily on a commercial scale, absent disadvantages which cannot be removed.

Accordingly, prior to the development of the present invention, there has been no commercially acceptable, economically attractive method or apparatus for substantially reducing the nitrogen oxides content of industrial waste gas streams, particularly the tail gas from a nitric acid plant; therefore, the art has long sought a method which can effectively and economically reduce the nitrogen oxides content absent the disadvantages of previously proposed processes.

SUMMARY OF THE INVENTION

In accordance with this invention the foregoing has been achieved through the present method for treating a gas stream containing nitrogen oxides, such as from a nitric acid plant, power plant, or other industrial source, particularly a tail gas from a nitric acid plant. The method of the present invention produces a product gas stream of reduced nitrogen oxides content and an aqueous ammonium nitrate solution product. In accordance with the present invention the nitrogen oxides removal and aqueous ammonium nitrate production are achieved by contacting a gas stream containing nitrogen oxides, under steady state conditions, with a reaction liquid comprising an acidic aqueous ammonium nitrate solution, specifically an aqueous ammonium nitrate solution at a pH of about 0.1 to about 3.5, preferably a pH less than about 1.0. The temperature of the reaction liquid is maintained below about 130° F., preferably through internal recycling. Under these conditions of pH and temperature, the formation of stable ammonium nitrite is suppressed and any nitrite formed is easily converted to the desired ammonium nitrate. Still further, the gas stream can thereafter be contacted with an ammoniacal solution of ammonium nitrate and subsequently with water.

Preferably the method of the present invention is carried out utilizing a sequence of steps, as follows:

(A) reacting a gas stream containing nitrogen oxides with an aqueous solution of ammonium nitrate at a pH of about 0.1 to about 3.5 (acidic ammonium nitrate).

(B) separating the gas and liquid of step (A), and reacting the separated gas with an aqueous solution of ammonium nitrate at a pH of about 7.5 to about 8.5 (ammoniacal ammonium nitrate);

(C) separating the gas and liquid of step (B) and contacting the separated gas with water, preferably slightly acidified; and (D) separating the gas and liquid of step (C), the separated gas having reduced nitrogen oxides content.

In an alternative embodiment, an additional reaction can be carried out between steps (B) and (C) above. This involves reacting the gas stream separated after step (B) with an aqueous solution of a mixture of urea and ammonium nitrate, the aqueous solution containing 30 to 40% by weight urea and 40 to 50% by weight ammonium nitrate. After separation of gas and liquid, the gas is contacted with water as in step (C).

The method of the present invention is specifically characterized by the fact that nitrogen oxides removal from the gas stream is accompanied by the formation of an aqueous solution of ammonium nitrate as a product. This greatly improves the economics of the process of the present invention when compared, for example, with typical processes involving the use of catalytic combustion or urea destruction, etc. In addition, the process of the present invention provides excellent efficiency in $NO_x$ removal, bringing the $NO_x$ content of the entering gas stream down to well below all presently imposed environmental standards. These characteristics of the present invention are principally associated with the step of contacting the gas stream containing nitrogen oxides, under steady state conditions, with a reaction liquid which comprises an acidic aqueous ammonium nitrate solution, specifically an aqueous ammonium nitrate solution at a pH of about 0.1 to about 3.5, preferably a pH less than about 1.0.

As indicated above, in more specific terms, the process of the present invention includes a first reaction of the gas stream containing nitrogen oxides with the acidic ammonium nitrate; thereafter reacting the gas stream with an ammoniacal ammonium nitrate; and subsequently contacting and reacting the gas stream with water, preferably in which the pH is maintained within the range of about 6.0 to about 6.5.

A feature of the present invention resides in the fact that by operating under the specified conditions the formation of ammonium nitrite is suppressed and any ammonium nitrite formed is in an unstable condition, readily oxidized to the desired ammonium nitrate. This is achieved by maintaining the acidic ammonium nitrate within the pH range of from about pH 0.1 to pH 3.5. Also, the temperature of this acidic ammonium nitrate is maintained below about 130° F. Higher temperatures tend to increase the formation of ammonium nitrate in an unstable crystal form.

In accordance with the present invention, the pH of this acidic ammonium nitrate is maintained within the proper range absent the need for free nitric acid introduction. For example, the pH of this acidic ammonium nitrate will be maintained within the specified range due to the reaction between the incoming gas stream containing $NO_x$ and the aqueous solution, forming free nitric acid.

Where required under certain circumstances, however, free nitric acid can be introduced into the acidic ammonium nitrate to assist in maintaining the pH within the desired range.

In accordance with the preferred aspects of the present invention, the process is carried out with a continuous downstream flow of the reaction liquids as well as a continuous upstream flow, thereby maintaining the reaction liquids in constant flow. This also helps to maintain the temperature below the desirable upper limit of about 130° F.

For example, with respect to downstream flow, a small portion of the acidic ammonium nitrate is continuously passed into the ammoniacal ammonium nitrate as well as into the water. In connection with ammoniacal ammonium nitrate a reaction tends to occur at the point of introduction of the acidic ammonium nitrate, forming additional ammonium nitrate. This also tends to reduce the amount of ammonium nitrite formed. With respect to the introduction of the acidic ammonium nitrate into the water, this has the effect of maintaining the pH of the water in the preferred range of pH 6.0 to pH 6.5.

In terms of the upstream flow of the various reaction liquids, in accordance with the preferred embodiment of the present invention, a portion of the water stream is withdrawn and introduced into the ammoniacal ammonium nitrate. In turn, a portion of the ammoniacal ammonium nitrate is withdrawn and introduced into the acidic ammonium nitrate. This has the effect of converting any ammonium nitrate formed in the ammoniacal ammonium nitrate into the desired ammonium nitrate. Again, it should be recognized that the conditions present in the acidic ammonium nitrate favor the production of ammonium nitrate and any ammonium nitrite formed is in an unstable condition, readily oxidized to ammonium nitrate.

In addition to this recycling and transfer of reaction liquids between the various stages, internal recycling within each reaction stage is also carried out in the preferred embodiment of the present invention. An aqueous solution of ammonium nitrate is withdrawn from the recycling acidic ammonium nitrate as a product of the method of the present invention.

Still further in a preferred embodiment of the present invention, the gas stream exiting the contact stage with the ammoniacal ammonium nitrate is passed through a venturi scrubber in which the gas stream is contacted with an additional water stream prior to the last contact zone. This has the effect of removing any particulate matter within the gas stream and to dissolve any crystalline ammonium nitrate and ammonium nitrite that may be present in the gas stream.

The present invention also includes apparatus for the removal of a gaseous component, e.g., nitrogen oxides, from a gas stream, wherein the apparatus comprises in combination:

a plurality of packed gas-liquid contact zones, serially arranged, wherein the first of the contact zones has an inlet for the introduction of a gas stream rich in the gaseous component to be removed and the last of the contact zones includes an outlet for withdrawal of a gas stream lean in such gaseous component, each of the plurality of contact zones including an inlet for the introduction of a liquid medium and an outlet for the withdrawal of spent liquid medium and gas, the liquid and gas in each contact zone passing concurrently therethrough; and separator means associated with each of the plurality of contact zones adjacent the outlet thereof so as to separate the spent liquid medium from gas, the gas then being forwarded from each contact zone to the next succeeding contact zone. Concurrent contact of a liquid and gas stream occurs in each of the packed gas-liquid contact zones.

The method and apparatus of the present invention when compared with previously proposed prior art processes have the advantages of efficiency, low cost (including product production) and the ability to effectively reduce the nitrogen oxides content far below current standards. When compared, for example, with the urea process, the method of the present invention not only allows for a more effective reduction of the nitrogen oxides content but, in addition, does not involve costly consumption or destruction of urea. When compared with the previously proposed ammonium nitrate scrubbing process, the method of the present invention has the advantage of not requiring an initial adjustment of the molar ratio of NO to $NO_2$ and a greater efficiency in the reduction of nitrogen oxides content.

DESCRIPTION OF THE PREFERRED EMBODIMENTS

Figure 1:
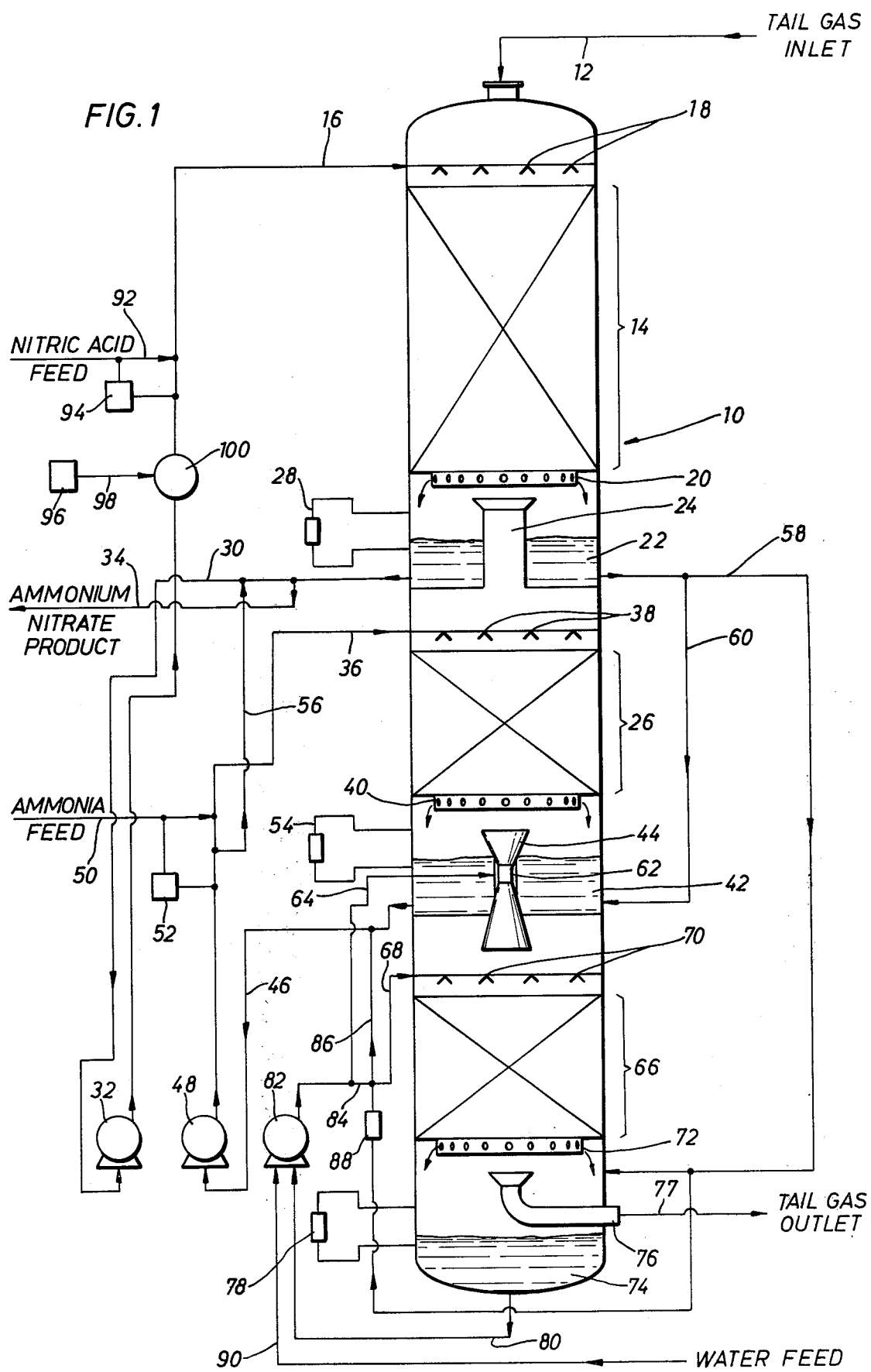
FIG. 1 is a cross-sectional view of the gas-liquid contact apparatus of the present invention.

The desirable features of the present invention described above and the advantages of the present invention previously described are achieved in accordance with the present invention by treating a gas stream containing nitrogen oxides, particularly a tail gas from a nitric acid plant, to produce a product gas stream of reduced nitrogen oxides content and a product comprising an aqueous solution of ammonium nitrate by a method which comprises:

(A) reacting a gas stream containing nitrogen oxides with an aqueous solution of ammonium nitrate at a pH of about 0.1 to about 3.5, preferably a pH of less than about 1.0.

(B) separating the gas and liquid of step (A) and reacting the separated gas with an aqueous solution of ammonium nitrate at a pH of about 7.5 to about 8.5, preferably a pH of about 8.0 to about 8.3;

(C) separating the gas and liquid of step (B) and reacting the separated gas with water, preferably at a pH of about 6.0 to about 6.8.

(D) separating the gas and liquid of step (C).

The gas separated in this step has the required reduced nitrogen oxides content, the nitrogen oxides content being below environmental standards. In addition, a product comprising an aqueous solution of ammonium nitrate is formed in this method.

The method of the present invention is preferably carried out utilizing gas-liquid contact apparatus separated into three stages, each stage being a packed contact zone allowing intimate contact of the gas stream containing nitrogen oxides and reaction liquid. While it is apparent that $NO_x$ removal is achieved in the present invention through a combination of absorption and reaction, the liquid media employed are referred to herein as reaction liquids since the principal removal is through chemical reaction.

In the first stage of such gas-liquid contact apparatus, the gas stream containing nitrogen oxides is reacted with an aqueous solution of ammonium nitrate at a pH of about 0.1 to about 3.5. The pH in the first stage is preferably below about 1.0. In the second stage the gas stream is reacted with an aqueous solution of ammonium nitrate at a pH of about 7.5 to about 8.5. In the third and final stage the gas stream is reacted with water, preferably slightly acidified to a pH of about 6.0 to 6.5. As will be clearly seen by reference to the accompanying figures to be described hereinafter, in the preferred embodiment of the present invention a venturi scrubber is present between the second and third stages and the gas stream is reacted with additional water in the venturi scrubber.

Still further, in an alternative embodiment of the present invention a further stage can be introduced between the second and third stages wherein the gas stream is reacted with an aqueous solution of a mixture of urea and ammonium nitrate, the aqueous solution containing 30 to 40% by weight urea and 40 to 50% by weight ammonium nitrate. The use of this additional stage will under certain circumstances allow an even further reduction in the nitrogen oxides content.

The gas-liquid contact apparatus employed in accordance with the present invention is so arranged as to allow contact of the gas stream containing nitrogen oxides and reaction liquids concurrently. Preferably both the gas stream and reaction liquids flow down each contact zone or stage over the packings which allow intimate contact of gas and liquid. A cyclone separator is located at the exit of each stage so as to separate the gas stream and reaction liquid, with the gas stream being passed to the next stage in the gas-liquid contact apparatus. The venturi scrubber is located between the second and third stages.

By treating the gas stream containing nitrogen oxides in this manner, it is possible in accordance with the present invention to reduce the nitrogen oxides content from its initial concentration of 2,500 to 6,000 ppm, typical of the tail gas of the nitric acid plant, down to 100 ppm or less, often below 50 ppm.

Referring to the drawings, FIG. 1 illustrates a typical system for carrying out the method of the present invention, for example, application of the method of the present invention for the removal of nitrogen oxides from the tail gas of a nitric acid plant.

As illustrated in the embodiment of FIG. 1, a process source, such as a nitric acid plant, discharges a gas stream which is introduced into the top of gas-liquid contact apparatus 10 through line 12. Taking as an example the tail gas from a nitric acid plant, the gas stream introduced into gas-liquid contact apparatus 10 through line 12 will contain both NO and $NO_2$. As previously indicated, the method and apparatus of the present invention are effective in the reduction of these nitrogen oxides and the production of an ammonium nitrate product, regardless of the initial concentration and/or ratio of the NO to $NO_2$. Accordingly, no adjustment of this mole ratio or concentration is necessary.

In the embodiment illustrated in FIG. 1, the gas stream introduced through line 12 is contacted in gas-liquid contact apparatus 10 in various stages with a co-current flow of reaction liquid. In the following discussion relative to the various stages of gas-liquid contact apparatus 10, reference will be made to steady state conditions, and alternative procedures for start-up will be later discussed.

In the first contact stage 14 the gas stream is contacted co-currently with a first liquid stream introduced through line 16 by means of shower heads 18. First stage 14 is preferably a packed contact zone allowing intimate contact between the gas stream and liquid. Any conventional packing means suitably employed in gas-liquid or liquid-liquid contact apparatus can be employed in accordance with the present invention. For example, some conventional packing shapes include Raschig rings, Beryl saddles, Intalox saddles, "Telleretts", Pall rings, etc. The packing material used in accordance with the present invention can be in the form of rings, saddles or other similar shape and can conventionally be constructed of such typical materials as metal, porcelain, clay, carbon and suitable plastics. Steel rings (304 Stainless) known as Hi-Pack are found to be particularly effective in allowing the intimate contact between the gas stream containing nitrogen oxides and reaction liquids.

While the size of the packing material employed in each of the stages of the gas-liquid contact apparatus 10 of the present invention is not particularly important, generally the packing material will range in size from about ½-inch to about 2 inches. Furthermore, it is preferred in accordance with the present invention that the packing be random rather than in a stacked manner. This allows for the most effective contact between the gas-stream containing nitrogen oxides and the various reaction liquids. Still further while it is applicable in accordance with the present invention to employ the same packing material in each of the various stages within the gas-liquid contact apparatus 10, it is possible in accordance with the present invention to vary the type and size of the packing material in the various stages depending upon the nature of the contact desired and, particularly, based upon the concentration of nitrogen oxides remaining in the gas stream. The selection of any particular packing material in each of the stages in accordance with the present invention can be carried out utilizing known parameters.

Under steady state conditions, the reaction liquid brought into co-current contact with the gas stream in first stage 14 will be an aqueous solution of ammonium nitrate having a free nitric acid content such that the pH of this first reaction liquid is within the range of pH 0.1 to pH 3.5. Preferably the pH of this first reaction liquid will be less than about pH 1.0.

Generally the ammonium nitrate concentration in this acidic ammonium nitrate will be from about 25% to about 50% by weight, preferably 30–35%, by weight, ammonium nitrate. This concentration is somewhat variable and can be regulated depending upon the desired ammonium nitrate product. If the ammonium nitrate concentration in this acidic ammonium nitrate is too dilute, a product will be formed which may require evaporation prior to subsequent use. Generally the free nitric acid content of this acidic ammonium nitrate is from about 10% to about 15% by weight. This provides the desired acidity for the acidic ammonium nitrate reaction liquid.

In this first stage 14, the $NO_x$ of the incoming gas reacts with the acidic ammonium nitrate generating free nitric acid and ammonium nitrate, together with some ammonium nitrite. The ammonium nitrite formed is minimized by the pH of the reaction medium and, under the conditions prevailing, the ammonium nitrite is highly unstable and readily oxidized to ammonium nitrate. Accordingly, the presence of ammonium nitrite in the reaction liquid of first stage 14 will be minimized.

The temperature within first stage 14 is preferably maintained below about 130° F., with cooler temperatures being preferred. Generally the initial gas feed to first stage 14 has a temperature within the range of about 85° to 100° F., with the temperature tending to rise due to the exothermic heat of reaction between the $NO_x$ and acidic ammonium nitrate. If the temperature in first stage 14 tends to rise above about 130° F. the ammonium nitrate formed becomes unstable, thereby preventing effective $NO_x$ removal and ammonium nitrate production. To keep the temperature below about 130° F., however, it is unnecessary in accordance with the present invention to provide any external cooling means and the temperature conditions within first stage 14 are maintained through the internal recycling to be discussed below. This internal recycling also maintains the acidity level within first stage 14. The pH of the acidic ammonium nitrate generally can be maintained within the ranges set forth above without free acid introduction.

It is presumed that the following chemical reactions take place in first stage 14:

1. $2NO + O_2 \rightarrow 2NO_2$

2. $3NO_2 + H_2O \rightarrow 2HNO_3 + NO$

3. $NH_4NO_3 + 4HNO_3 + NO_2 + NO + O_2 \rightarrow 2NH_4NO_3 + 4NO + 5O_2$

4. $NH_4NO_3 + HNO_3 + NH_3 \rightarrow 2NH_4NO_3$

5. $2NH_4NO_2 + O_2 \rightarrow 2NH_4NO_3$

The gas-liquid mixture exiting first stage 14 is separated by a cyclone separator 20 which forces the liquid to the outside, forming a pool 22 and directs the gas stream to the center, the gas stream flowing through weir 24 into the second stage 26. This gaseous stream will include the $NO_x$ which is not removed by reaction in first stage 14 and nitric acid in a gaseous form, together with the inert gases of the tail gas. The $NO_x$ content, however, will be greatly reduced due to the absorption and reaction of the $NO_x$ in first stage 14. Generally, about 40% to about 75% of the $NO_x$ is removed in this first stage.

As illustrated in the embodiment of FIG. 1, the level of pool 22 is controlled by a suitable liquid level control device 28. This liquid level control device 28 controls (through a valve not illustrated) the recycling of reaction liquid through first stage 14. A portion of the liquid in pool 22 is withdrawn through line 30 and recycled by acidic ammonium nitrate pump 32 through line 16 and shower heads 18 into first stage 14. A portion of the liquid in line 30 is withdrawn through line 34 as ammonium nitrate product. This product can be utilized as such or, if desired, can be diluted or concentrated and sent to a typical neutralizer for further treatment and/or production of fertilizer.

Typically, the ammonium nitrate solution which is withdrawn as product through line 34 will comprise a 24%-35% by weight aqueous solution of ammonium nitrate. The concentration of ammonium nitrate in this solution can be controlled by the ammonium nitrate concentration in first stage 14.

Referring again to the embodiment illustrated in FIG. 1, the gas passing through weir 24 into second stage 26 is contacted co-currently in second stage 26 with a second reaction liquid introduced into second stage 26 through line 36 and shower heads 38. Again, second stage 26, like first stage 14 is preferably a packed gas-liquid contact zone with any of the conventional packing materials being applicable. Stainless steel rings have again been found to be a particularly advantageous packing material. Preferably, first stage 14 provides greater contact between the gas and reaction liquid than second stage 26. First stage 14 is preferably constructed to provide from two to three times the contact time between the incoming gas and reaction liquid than second stage 26. The additional contact time is required in first stage 26 since the major portion of the $NO_x$ removal and conversion is carried out in this stage. Accordingly, the contact time between the gas and liquid in second stage 26 need not be as great as that for first stage 14. This contact time can be varied by adjusting the length of the stage and/or the nature of the packings, etc. In general terms, all that is required is that the first and second stages be of such size that sufficient contact is achieved between the gas and liquid phases for adequate contact and reaction.

The second reaction liquid introduced into second stage 26 through line 36 is, like the first reaction liquid, an aqueous solution of ammonium nitrate. However, this second reaction liquid is an ammoniacal solution having a pH within the range of about 7.5 to about 8.5, preferably a pH of about 8.0 to about 8.3. This ammoniacal ammonium nitrate effectively reduces the $NO_x$ content to the gas stream from an incoming level of at least several hundred ppm from first stage 14 to an exit level of 100 ppm or below.

The gas-liquid mixture exiting second stage 26 is separated by a cyclone separator 40. Cyclone separator 40 forces the liquid to the outside forming pool 42 and directs the gas stream, now with a substantially reduced $NO_x$ content to the center where is flows through a venturi scrubber 44.

As illustrated in the embodiment of FIG. 1 a portion of the liquid in pool 42 is withdrawn through stream 46 and recycled to second stage 26 through line 36 by means of ammoniacal ammonium nitrate pump 48. The pH of the ammoniacal ammonium nitrate solution in second stage 26 is controlled by the addition of ammonia to stream 36 from line 50 in response to pH measurements of line 36 taken by pH meter 52.

The concentration of ammonium nitrate in this ammoniacal ammonium nitrate is essentially the same as that described above for the acidic ammonium nitrate. Again, the ammonium nitrate concentration can vary within wide limits, although an ammonium nitrate concentration of from about 25% to about 50% by weight is generally employed. The ammonium nitrate concentration in the ammoniacal ammonium nitrate is preferably about 30% to about 35% by weight.

The liquid level in pool 42 is controlled by means of liquid level control device 54, which device (through valves not shown) controls the flow of ammoniacal ammonium nitrate out of pool 42 through line 46 and recycled through line 36 to second stage 26.

As illustrated in the embodiment of FIG. 1, a portion of the recycling ammoniacal ammonium nitrate in line 36 is withdrawn through line 56 and recycled to first stage 14 through line 30, pump 32 and line 16. This recycle of some of the ammoniacal ammonium nitrate into first stage 14 and the acidic ammonium nitrate has the effect of converting any ammonium nitrite which may be formed in second stage 26 into ammonium nitrate in first stage 14, wherein the conditions are more favorable for ammonium nitrate production and conversion of unstable ammonium nitrite into ammonium nitrate. The amount of ammoniacal ammonium nitrate recycled from second stage 26 to first stage 14 is small compared to the total amount of acidic ammonium nitrate recycling through line 16, such that the pH within first stage 14 is not substantially affected and an acidic pH within the ranges described above can be maintained. A reaction will tend to occur in line 30 between the ammonia in the ammoniacal ammonium nitrate solution and the free nitric acid of the acidic ammonium nitrate, forming additional ammonium nitrate.

As illustrated in the embodiment of FIG. 1, a portion of pool 22 is also withdrawn through line 58 and introduced through line 60 into pool 42. This has the effect of introducing some of the acidic ammonium nitrate in pool 22 into the ammoniacal ammonium nitrate of pool 42. A reaction tends to occur in pool 42 at the point of introduction of the acidic ammonium nitrate through line 60. This further has the effect of cooling the system, thereby assisting in maintaining the temperature within first stage 14 below about 130° F.

The reactions which occur in second stage 26 can be generally represented as follows:

$$NH_3 + HNO_3 \rightarrow NH_4NO_3$$

$$2NH_4NO_3 \rightarrow 2NH_4NO_2 + O_2$$

$$NH_4NO_3 + 4HNO_3 + NO_2 + NO + O_2 \rightarrow 2NH_4NO_3 + 4NO + 5O_2$$

Again, the gas phase leaving second stage 26 has a substantially reduced nitrogen oxides content, generally in the range of 100 ppm or lower. Such gas phase separated by cyclone separator 40 is passed through venturi scrubber 44 together with a third reaction liquid introduced into the neck section 62 of venturi scrubber 44 through line 64. This third reaction liquid introduced through line 64 is water, preferably slightly acidified to a pH within the range of about 6.0 to about 6.5, a pH which is slightly basic in terms of a neutral point of the ammonium nitrate salt.

The venturi scrubber 44 removes any sub-micron particles present in the gas stream. In addition, the contact within venturi scrubber 44 of the gas stream and water introduced through line 64 liquifies any small ammonium nitrate and ammonium nitrite crystals, thereby effectively allowing additional $NO_x$ removal.

The gas exiting venturi scrubber 44 together with the water introduced into venturi scrubber 44 are passed directly into a third stage 66 together with additional water introduced through line 68 by means of shower heads 70. This third stage 66 can be essentially the same as second stage 26 and is a packed gas-liquid contact zone employing any of the previously described packing materials. Again, stainless steel rings have been found to be particularly advantageous in each of these packed stages.

Referring again to the embodiment illustrated in FIG. 1, the gas-liquid stream exiting third stage 66 is separated by cyclone separator 72 which again forces the liquid to the outside forming a liquid pool 74 at the base of gas-liquid contact apparatus 10. The gas stream with substantially reduced nitrogen oxides content, and comprising essentially nitrogen, is directed to the center by cyclone separator 72 and exists gas-liquid contact apparatus 10 through tail gas outlet 76 and line 77.

The liquid level in pool 74 is monitored and controlled (through valves not shown) by liquid level control device 78. A portion of the liquid in pool 74 is withdrawn through line 80 and recycled to third stage 66 by means of water pump 82. A portion of this recycled water is introduced into the neck 62 of venturi scrubber 44 through line 64 and a further portion is withdrawn from line 64 through line 84 and introduced into third stage 66 by means of line 68 and shower heads 70. A still further portion of the water is withdrawn from line 84 through line 86 and recycled to second stage 26 through line 46, pump 48, line 36 and shower heads 38. This has the effect of providing a continuous upward flow of the reaction liquids, eventually reaching first stage 14 wherein the conditions are such that any nitrite present tends to be in an unstable form, thereby decreasing the formation of nitrites and increasing ammonium nitrate production.

As illustrated in FIG. 1, the pH of the recirculating water is measured by pH meter 88. In response to such pH measurement, a small stream of the acidic ammonium nitrate in pool 22 is introduced into pool 74 through line 58. This brings the pH of the water into the range of pH 6.0 to pH 6.5. Generally, this recycling of the acidic ammonium nitrate from first stage 14 to third stage 66 provides an ammonium nitrate concentration in the water of third stage 66 of up to about 9%, generally 5%-9% by weight. Accordingly this third reaction liquid, while referred to as water, is in the preferred embodiment of the present invention a weak aqueous solution of ammonium nitrate.

It has been discovered in accordance with the present invention that if the pH of the water in third stage 66 is substantially below pH 6.0, there is a tendency for a release of $NO_x$ from the reaction liquid thereby increasing the $NO_x$ content in the tail gas withdrawn from gas-liquid contact apparatus 10 through tail gas outlet 76. On the other hand, if the pH of the water in third stage 66 is too high, i.e. about pH 7 for example, there is a tendency for ammonia to break through and be withdrawn with the tail gas. To prevent this the pH is maintained within the range of about 6.0 to about 6.5 by adding to the water in pool 74 a portion of the acidic ammonium nitrate of pool 22.

As an alternative to this, however, acidification of the water in pool 74 can be carried out by direct addition to nitric acid to pool 74, thereby bringing the pH to within the range of about 6.0 to about 6.5. This addition of the acidic ammonium nitrate or nitric acid to lower the pH of the water is desirable due to the generally basic nature of feed water.

Due to the withdrawal of the ammonium nitrate product through line 34, it is necessary to provide a continuous feed of reaction liquid to gas-liquid contact apparatus 10. This is achieved through water feed line 90 directly into the suction of water pump 82, from a source not illustrated.

As previously indicated, the pH within first stage 14 is maintained within the desired acidic range without the need for acid introduction, solely by the reaction between the $NO_x$ and reaction medium forming nitric acid and ammonium nitrate. However, where desired for particular purposes, it may be advantageous in some instances to provide a separate feed of nitric acid to further control the pH of the acidic ammonium nitrate in first stage 14. This can be achieved, for example, by introducing nitric acid feed into line 16 through line 92 (from a source not shown) in response to a pH measurement of the acidic ammonium nitrate in line 16 by pH meter 94. Again, however, such use of a separate nitric acid feed is generally unnecessary to achieve the advantages of the method of the present invention.

In addition, the reactions which occur in first stage 14 and second stage 26 provide sufficient oxidizing environment for the oxidation of ammonium nitrite to ammonium nitrate. However, for particular purposes, where additional oxidizing environment is desirable, it may be advantageous to have a source of oxygen or air 96, providing a flow of oxygen or air in line 98 to react with the acidic ammonium nitrate in line 16 in a separate oxidizing chamber 100. Again however, this feature of the present invention is optionally employed for particular purposes.

As previously indicated the foregoing discussion of FIG. 1 has been presented in terms of steady state conditions and the pH ranges specified and flows specified are those which are achieved and occur during steady state operations involving $NO_x$ removal from a gas stream and concurrent production of ammonium nitrate product. Similarly, the components and concentrations of the various reaction media are those which occur during steady state operations and can vary considerably from the initial concentrations and components at start-up.

The start-up of the method of the present invention can be achieved by using as the initial reaction liquid either an aqueous ammonium nitrate solution or water. Taking water as an example, water feed can be introduced into third stage 66 by passing feed water through line 90 into the suction of water pump 82 and from water pump 82 into third stage 66 by means of line 68 and shower heads 70. Simultaneously water will be introduced into the neck 62 of venturi scrubber 44 through line 64. The liquid level in pool 74 will build up until the desired predetermined level is reached, whereupon water will cycle through line 86, pump 48, line 36 and shower heads 38 into second stage 26 in response to level control 78. Internal recycling of the water will occur in second stage 26 through line 46, pump 48 and line 36 with a continuous build-up of liquid level in pool 42. When the liquid level in pool 42 has reached the desired level, a portion of the recycling water will be passed to first stage 14 through line 56, line 30, pump 32, line 16 and shower heads 18 in response to level control 54. This will create a continuous build-up of water level in pool 22 and when the desired predetermined level is reached, recycling between stages 1, 2 and 3 through line 58 and 26 will occur in response to level control 28. When each of pools 22, 42 and 74 is at the desired level and the recycling is occurring the gas feed can be started. The reaction between the $NO_x$ of the gas feed and the water in first stage 14 will produce nitric acid and the desired ammonium nitrate will be produced through the introduction of ammonia feed through line 50. This will allow the pH in first stage 14 to fall to the desired acidic range and the ammonia feed will control the pH range of second stage 26. When these ranges are reached, steady state operations will continue and can be maintained in the manner described above.

A similar operation can be achieved using instead of an initial water feed, a feed of ammonium nitrate or alternatively the ammonium nitrate can be fed directly to first stage 14 and second stage 26 to initiate the start-up more quickly. It has been determined in accordance with the present invention, however, that effective start-up can be achieved with an initial water feed.

Figure 2:
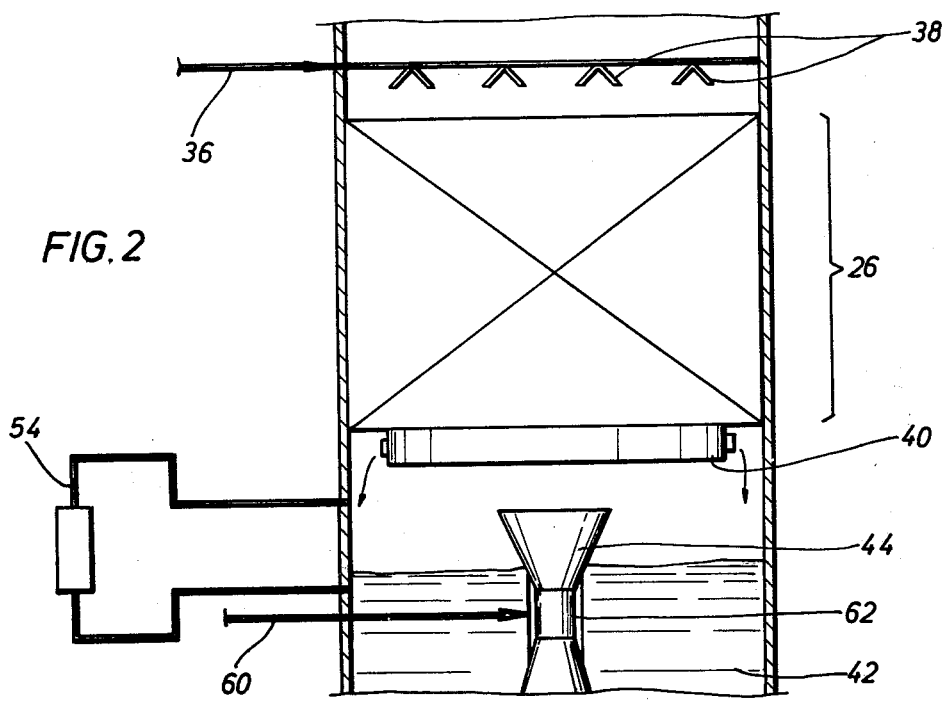
FIG. 2 is an enlarged partial cross-sectional view of the second stage of the gas-liquid contact apparatus of FIG. 1.
Figure 3:
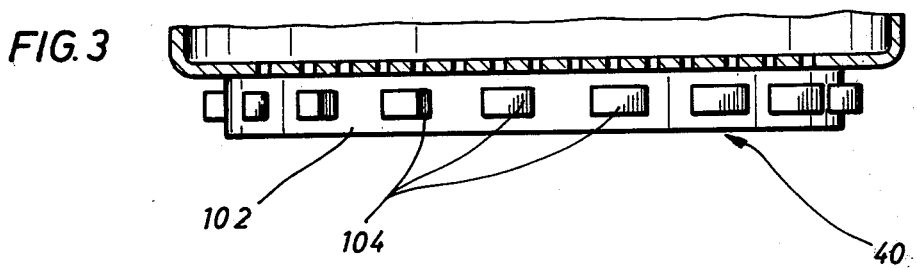
FIG. 3 is an enlarged partial cross-sectional view of the cyclone separator in FIG. 2.
Figure 4:
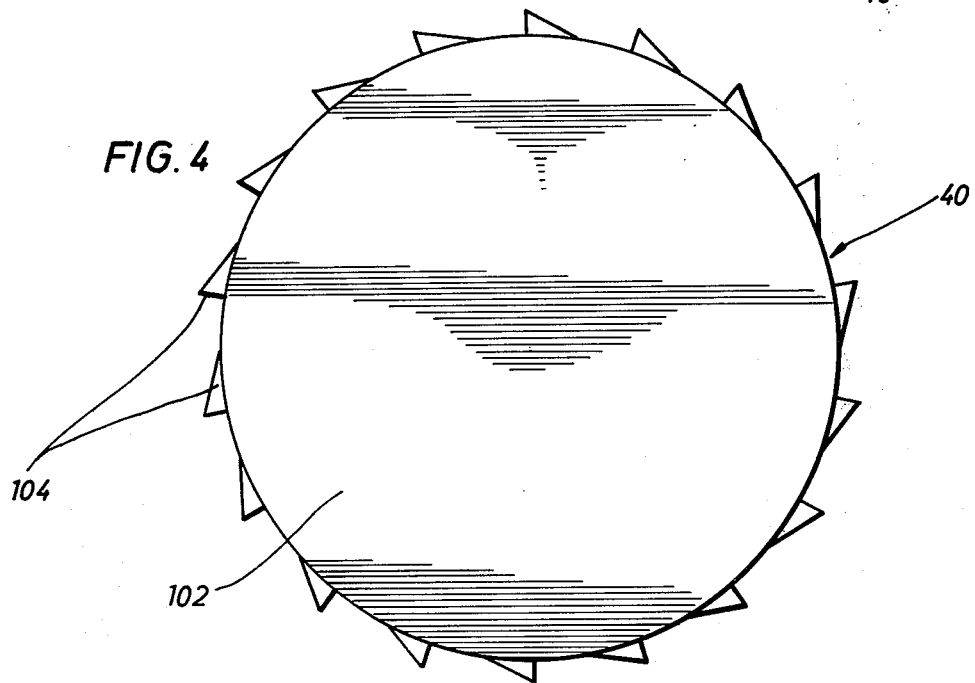
FIG. 4 is a bottom view of the cyclone separator of FIG. 3.

An enlarged partial cross-sectional view of the second stage 26 and associated elements for separation of gas and liquid are illustrated in further detail in FIG. 2, while FIGS. 3 and 4 respectively show in greater detail the cyclone separator employed in each of the stages to separate the gas and liquid exiting each packed gas-liquid contact zone. As illustrated in FIG. 2, second stage 26 of the gas-liquid contact apparatus is supplied with a cyclone separator 40 adjacent the exit side of the packed gas-liquid contact zone. As illustrated in FIGS. 3 and 4, the cyclone separator includes a body section 102 of truncated conical configuration with the outer periphery having a plurality of openings in the form of vanes 104, which by centrifugal action force the liquid of the gas-liquid mixture to the side walls of the gas-liquid contact apparatus, the liquid collecting in a reservoir at the base of the gas-liquid contact stage. The gas is directed to the center of the apparatus and passes to the next succeeding stage through venturi scrubber 44.

Referring again to FIG. 2, it is noted that in the stage illustrated, second stage 26, a level control device 54 is situated so as to control the level of the liquid in the reservoir at the base of the stage so as to prevent the liquid from overflowing into the next succeeding stage. This allows the gas which passes through the opening defined by venturi scrubber 44 into the next stage to be contacted with a fresh reaction liquid which, in the case of third stage 66, is water, preferably of a pH of from about 6.0 to about 6.5. Additional water is also contacted with the gas stream by introduction into venturi scrubber 44 into neck 62 through line 60.

In accordance with a further embodiment of the present invention an additional packed contact zone, together with a cyclone separator, can be situated between the second and third stages so as to react the gas exiting the second stage with a reaction liquid comprising an aqueous solution of a mixture of urea and ammonium nitrate, the aqueous solution containing 30% to 40% by weight urea and 40% to 50% by weight ammonium nitrate. The spent reaction liquid will be withdrawn from the system and the gas separated by a cyclone separator forwarded to the third stage described above. The addition of this step can provide an even further reduction of nitrogen oxides content.

Also, while the first stage, the acidic ammonium nitrate stage, has been described above as a single stage allowing greater contact between the gas stream and reaction liquid than the later stages, it may be more practical under certain circumstances of design to split the first stage into two or more sub-stages, each employing the same or substantially the same reaction liquid. This can be easily achieved by employing no liquid level control for the various sub-stages, thereby being a flow of reaction liquid from each sub-stage to the next succeeding sub-stage within this first stage. In this way greater contact between the gas stream and reaction liquid can be achieved without the need for a single large reaction zone.

The method of the present invention is typically applied to the removal of $NO_x$ from the tail gas of a nitric acid plant, generally operating at about 7 atmospheres, i.e. 85–87 lbs. pressure. This method however is equally applicable to nitric acid plants operating at 3 atmospheres pressure and simply by a scaling up of the design could be utilized in an atmospheric pressure nitric acid plant. Generally when considering a 7 atmosphere nitric acid plant, the initial flow of tail gas will be from about 0.5 to about 2.0 cu.ft/sec., the tail gas containing from about 2,500 to about 6,000 ppm $NO_x$ as NO and $NO_2$. The temperature of the incoming tail gas is typically 85° to 100° F.

On the basis of a 7 atmosphere nitric acid plant having a capacity of 100 ton/day the following comprises a typical flow of gas and liquids based on the apparatus illustrated in FIG. 1.

| Line (from FIG. 1) | Flow | | Composition |
|---|---|---|---|
| 12 | 1.25 | cu.ft./sec. | tail gas at 2500–6000 ppm $NO_x$ as NO and $NO_2$ 85°–100° F. |
| 16 | 55 | GPM | acidic ammonium nitrate |
| 30 | 50.6 | GPM | acidic ammonium nitrate |
| 56 | 4.4 | GPM | ammoniacal ammonium nitrate |
| 34 | 1.2 | GPM | acidic ammonium nitrate |
| 46 | 55 | GPM | ammoniacal ammonium nitrate |
| 36 | 50.6 | GPM | ammoniacal ammonium nitrate |
| 80 | 55 | GPM | water |
| 64 | 12 | GPM | water |
| 86 | 1.42 | GPM | water |
| 68 | 43 | GPM | water |
| 90 | 1.42 | GPM | water |
| 60 | 3 | GPM | acidic ammonium nitrate |
| 58 | sufficient to maintain 6.5 to 7.0 pH | | acidic ammonium nitrate |
| 50 | 151 | lb/hr | ammonia liquid |
| 77 | 1634 | mols/hr | tail gas-reduced $NO_x$ < 100 ppm |

The method and apparatus of the present invention allow for the effective reduction of the nitrogen oxides content in a gas stream to below all environmental standards while producing an aqueous solution of ammonium nitrate product. This is achieved in accordance with the present invention by adherence to the parameters above, and in particular, the parameter of pH of the acidic ammonium nitrate employed in the described method. The above described parameters must be taken as steady state conditions since fluctuations of pH outside the ranges above will inevitably occur, particularly during start-up, etc. The values set forth above for the various pH ranges for the reaction liquids employed in the method and apparatus of the present invention, therefore, represent steady state conditions and, in some instances, an average pH which occurs over an extended period of time, where fluctuations occur during steady state operations.

In accordance with the method and apparatus of the present invention, it is possible to effectively reduce the nitrogen oxides content of a gas stream economically and with a minimal energy expenditure as compared with previous proposals to achieve the same result. The method and apparatus of the present invention, therefore, comprise a substantial improvement over previous methods and apparatus for the reduction of nitrogen oxides content in a gas stream, particularly the tail gas from a nitric acid plant.

The present invention will now be described by reference to the following examples. It should be understood, however, that the present invention is in no way limited by these examples, and the same are presented for purposes of illustration only.

EXAMPLE 1

The method of the present invention was carried out utilizing apparatus such as illustrated in FIG. 1, with the exception that the first stage was in the form of two-sub-stages and free nitric acid was introduced into the first stage. Also, there was no acidification of the water of the third reaction liquid. The feed to the apparatus was the tail gas from a nitric acid plant (7 atmospheres) containing approximately 2,500 parts nitrogen oxides in the form of NO and $NO_2$. The tail gas was passed through the liquid-gas contact apparatus concurrently in contact with the following reaction liquids in the order of contact:

| Stage | Reaction Liquid | pH |
|---|---|---|
| 1 (first sub-stage) | Aqueous ammonium nitrate, specific gravity 1.162, temp. 82° F. | 0.9 |
| (second sub-stage) | Aqueous ammonium nitrate, specific gravity 1.182, temp. 80° F. | 0.1 |
| 2 | Aqueous ammonium nitrate, specific gravity 1.124, temp 80° F. | 8.5 |
| 3 | Water, specific gravity 1.030–1.035, temp. 77–80° F. | 8.4–8.5 |

When operating in the foregoing manner, the final gas leaving the third stage was found to have a nitrogen oxides content of 70 ppm, far below environmental standards.

EXAMPLE 2

Utilizing the same system as employed in Example 1, the nitrogen oxides content in a tail gas from a nitric acid plant was reduced from 2,500 ppm at the inlet to the apparatus to 80 ppm at the outlet of the apparatus, utilizing a reaction sequence as follows:

| Stage | Reaction Liquid | pH |
|---|---|---|
| 1 (first sub-stage) | Aqueous ammonium nitrate, specific gravity 1.246, temp. 79° F. | 0.5 |
| (second sub-stage) | Aqueous ammonium nitrate, specific gravity 1.262, temp. 78° F. | approx. 0.0 |
| 2 | Aqueous ammonium nitrate, specific gravity 1.240, temp. 78° F. | 8.2 |
| 3 | Water, specific gravity 1.026–1.110, temp. 75–78° F. | 8.0–9.0 |

EXAMPLE 3

Utilizing the same system as in Example 1, the nitrogen oxides content of a tail gas from a nitric acid plant containing approximately 2,000 ppm nitrogen oxides was reduced to 80 ppm. The reaction sequence was as follows:

| Stage | Reaction Liquid | pH |
|---|---|---|
| 1 (first sub-stage) | Aqueous ammonium nitrate, specific gravity 1.128, temp. 76° | 0.5 |
| (second sub-stage) | Aqueous ammonium nitrate, specific gravity 1.128, temp. 76° F. | 0.3 |
| 2 | Aqueous ammonium nitrate, specific gravity 1.092, temp. 76° F. | 8.2 |
| 3 | Water, specific gravity 1.030–1.032, temp. 75° F. | 8.4 |

EXAMPLE 4

The method of the present invention was carried out utilizing apparatus as illustrated in FIG. 1, with the single difference being that the first stage was divided into two sub-stages, with a continous flow of reaction liquid from the first sub-stage to the second sub-stage. As a result, the two sub-stages together acted as a single reaction stage providing greater contact between the gas stream and reaction liquid than either of the subsequent reaction stages. Approximately twice the contact time could be achieved in the first reaction stage, as compared to the second and third reaction stages without the requirement of a single large reaction zone.

In this experimental run, the gas feed was the tail gas from a seven atomsphere nitric acid plant containing approximately 3,500 ppm $NO_x$ as NO and $NO_2$. No preliminary treatment of the tail gas was carried out and the tail gas was introduced directly into the gas-liquid contact apparatus.

Under steady state conditions the tail gas was contacted with the following reaction liquids:

| Stage | Reaction Liquid | pH |
|---|---|---|
| 1 | acidic aqueous solution of ammonium nitrate | 1.2–2.5 |
| 2 | ammoniacal aqueous solution of ammonium nitrate | 8.1–8.3 |
| 3 | water | 6.0–6.5 |

It was determined as a result of this experimental run that the acidic ammonium nitrate reduced the $NO_x$ content of the tail gas down to about 2,100 ppm (48.8% efficiency). The final exit gas stream contained 27 ppm $NO_x$ (99.3% efficiency).

The advantages of the method of the present invention with respect to formation and recovery of an aqueous solution of ammonium nitrate product can be seen by reference to the following material balance, which is based on the above run.

| Material Balance | | |
|---|---|---|
| I. | Plant Rate | — 87.2 Ton/Day of 100% $HNO_3$ |
| II. | Time on Stream | — 12 Hours |
| III. | $NO_x$ Inlet | — 3500 ppm |
| | Outlet | — 27 ppm |
| IV. | $NH_3$ used | = 1,120 lbs ÷ 17.03 = 65.77 moles of $NH_3$ |
| | | 1,114.4 lbs corrected for 0.5% moisture |
| V. | $HNO_3$ used | = None |
| VI. | $NH_4NO_3$ formed | = 10,280 lbs. at 39.87% wt. = 4098.6 lbs. |
| | | at 100% ÷ 80 = 51.83 moles of $NH_4NO_3$ formed |
| VII. | Free $HNO_3$ | = 4098.6 × 2.99% = 122.55 lbs. at 100% ÷ 63 — 1.95 moles $HNO_3$ |
| 1. | $NH_3$ loss | = $\frac{[1120 - 51.88\,(17.03)]}{87.2\,(12)}$ |
| | | 24 = 5.44 lbs/ton |
| | $HNO_3$ generated | = $\frac{[4098.6\,(63/80) + 122.6 - 0]}{87.2\,(12)}$ |
| | | 24 = 76.81 lbs. |
| | $HNO_3$ | = 76.8 lbs. of $HNO_3$ generated/ton of $HNO_3$ |
| 2. | $NH_3$ used | = 1120 lbs./12 hrs. corrected = 1114.4 lbs × 2 — 2228.8 lbs. |
| | | = 1.11 tons of $NH_3$/Day. |
| | $HNO_3$ used | = None |
| | $NH_4NO_3$ formed | = 4098.6 lbs. × 2 = 4.1 tons of $NH_4NO_3$/Day |

EXAMPLE 5

Experimental runs were carried out to demonstrate the effectiveness of the method of the present invention under a variety of conditions.

The system utilized was as illustrated in FIG. 1, with the exception that the first stage was divided into two sub-stages, similar to Example 4. The parameters observed and results achieved are illustrated in the following Table 1.

EXAMPLE 6

The method of the present invention was carried out utilizing a system such as described in Example 1, including an additional stage between stages 2 and 3. The feed to the apparatus was the tail gas from a nitric acid plant containing approximately 2,000 ppm. nitrogen oxides in the form of NO and $NO_2$. The tail gas was passed through the multi-stage liquid-gas contact apparatus, concurrently in contact with the following reaction liquids in the order of contact:

| Stage | Scrubbing Liquid | pH | Composition |
|---|---|---|---|
| 1 (first sub-stage) | Aqueous ammonium nitrate | 3.1 | 54% ammonium nitrate |
| | Aqueous ammonium nitrate | 1.4 | 52% ammonium nitrate |
| 2 (second sub-stage) | Aqueous ammonium nitrate | 8.0 | 49.5% ammonium nitrate |
| addition stage | Aqueous ammonium nitrate-urea | | 45% ammonium nitrate - 35% urea |
| 3 | water | 8.4 | — |

When operating in the foregoing manner, the gas leaving the final stage was found to have a nitrogen oxides content of 45 ppm, far below environmental standards. This further establishes the effectiveness of the process of the present invention in the reduction of the nitrogen oxides content and the production of a gas stream which can be safely emitted to the atmosphere.

Further modifications and alternative embodiments of the method and apparatus of this invention will be apparent to those skilled in the art in view of the description above. Accordingly, the preceding description is to be construed as explanatory and illustrative only and is for the purpose of teaching and enabling those skilled in the art to carry out and reproduce the invention. It is to be understood that the forms of the invention herein shown and described are to be taken as presently preferred embodiments and best mode for carrying out the method and apparatus of the present invention. Various changes may be made in shape, size and/or arrangements of elements. For example, the first reaction stage can be divided into a plurality of sub-stages and one or more additional reaction stages can be interposed between those described to achieve particular desired results. Furthermore, certain features of the invention may be utilized independent of others, as would be apparent to one skilled in the art having the benefit of this description of the invention.

TABLE 1

| | | | Liquid Samples | | | Gas Samples | | % Efficiency | Process Stream | | | |
|---|---|---|---|---|---|---|---|---|---|---|---|---|
| | | | % wt. | % wt. | % wt. | $NO_x$ Analyses | | | Density | | | |
| Run A | pH | Sp/G/° F. | $NH_4NO_3$ | $NH_4NO_2$ | Free $HNO_3$ | lbs/hr. | ppm | $NO_x$ Removal | Lbs./Hr. | #/cf | ° F. | PSIG |
| Stage 1 | 1.7 | 1.096/85 | 24.69 | | 0.66 | 147.6 | 4100 | | 40,041 | 0.49 | 90 | 86 |
| | 0.5 | 1.108/84 | 29.22 | 0.472 | 2.94 | 75.6 | 2100 | 48.8 | | | | |
| Stage 2 | 8.0 | 1.079/90 | 23.13 | 2.33 | | 4.7 | 131 | 96.8 | | | | |
| Stage 3 | 6.1 | 1.056/91 | 16.09 | | | 3.6 | 100 | 97.6 | 40,310 | 0.45 | 105 | 84 |
| Run B | | | | | | | | | | | | |
| Stage 1 | 0.8 | 1.156/88 | 36.12 | | 5.96 | 173.5 | 4820 | | 40,041 | 0.49 | 90 | 86 |
| | 0.1 | 1.001/88 | 41.51 | 0.587 | 13.05 | 58.7 | 1630 | 66.2 | | | | |
| Stage 2 | 8.2 | 1.121/100 | 37.98 | 4.47 | | 4.2 | 116 | 97.6 | | | | |
| Stage 3 | 7.3 | 1.048/101 | 16.14 | | | 3.4 | 95 | 98.0 | 40,310 | 0.45 | 110 | 84 |
| Run C | | | | | | | | | | | | |
| Stage 1 | 0.1 | 1.134/89 | 34.81 | | 8.24 | 128.7 | 3575 | | 40,040 | 0.49 | 90 | 86 |
| | 0.0 | 1.149/91 | 38.69 | 0.710 | 14.92 | 37.7 | 1048 | 70.7 | | | | |
| Stage 2 | 8.2 | 1.081/103 | 31.44 | 3.19 | | 5.9 | 165 | 95.4 | | | | |
| Stage 3 | 6.9 | 1.028/103 | 12.66 | | | 4.5 | 125 | 96.5 | 40,310 | 0.45 | 112 | 84 |

What is claimed is:

1. A method for treating a gas stream containing nitrogen oxides and oxygen to produce a final product gas stream of reduced nitrogen oxides content and an aqueous solution of ammonium nitrate as a product which comprises:

providing a multi-stage liquid-gas contact apparatus with a plurality of contact stages arranged in series;

establishing in the first stage of said multi-stage gas-liquid contact apparatus an acidic aqueous solution of ammonium nitrate; introducing into said first stage a gas stream containing nitrogen oxides and oxygen;

simultaneously recycling through said first stage a first reaction liquid comprising an acidic aqueous solution of ammonium nitrate and a stream of an ammoniacal aqueous solution of ammonium nitrate, while maintaining the pH in said first stage at a pH of about 0.1 to about 3.5, said gas stream, first reaction liquid and stream of an aqueous ammoniacal solution of ammonium nitrate flowing concurrently through said first stage;

separating the gas and liquid exiting said first stage into a first stage product gas stream and a first stage product liquid stream;

introducing said first stage product gas stream into a second stage;

simultaneously flowing through said second stage a second reaction liquid comprising an ammoniacal aqueous solution of ammonium nitrate at a pH of about 7.5 to about 8.5, said first stage product gas stream and second reaction liquid flowing concurrently through said second stage;

separating the gas and liquid exiting said second stage into a second stage product gas stream and a second stage product liquid stream;

introducing said second stage product gas stream into a third stage;

simultaneously flowing through said third stage a third reaction liquid comprising water, said second stage product gas stream and third reaction liquid flowing concurrently through said third stage;

separating the gas and liquid exiting said third stage as a third stage product gas stream and a third stage product liquid stream; and withdrawing said third stage product gas stream out of said multi-stage gas-liquid contact apparatus as a final product gas stream of reduced nitrogen oxides content.

2. The method of claim 1, wherein said gas stream containing nitrogen oxides and oxygen is a tail gas resulting from the manufacture of nitric acid.

3. The method of claim 1, wherein in each of the said first through third stages the gas and reaction liquid are contacted in a packed contact zone.

4. The method of claim 3, wherein the second stage product gas stream is passed through a venturi scrubber with additional third reaction liquid prior to introduction into the third stage.

5. The method of claim 1, wherein the pH of the second reaction liquid is maintained within the range of about 7.5 to about 8.5 by addition of ammonia to an aqueous ammonium nitrate solution.

6. The method of claim 1, wherein each separation into a product gas stream and a product liquid stream is carried out by using a cyclone separator.

7. The method of claim 1, wherein the third reaction liquid is acidified to a pH of from about 6.0 to about 6.5 through the addition of ammonium nitrate.

8. The method of claim 1, further including:

continuously adding water to the third stage;

continously withdrawing a portion of said third reaction liquid and introducing at least a portion of the withdrawn third reaction liquid into the second stage;

continuously withdrawing a portion of the second reaction liquid and introducing at least a portion of the withdrawn second reaction liquid into the first stage; continously withdrawing a portion of the first reaction liquid and introducing at least a portion of the withdrawn first reaction liquid into the third stage; and continously withdrawing a second portion of the first reaction liquid as a product ammonium nitrate solution.

9. The method of claim 1, wherein a portion of the withdrawn first reaction liquid is introduced into the second stage while maintaining the pH of said second stage at a pH of about 7.5 to about 8.5.

10. The method of claim 1, wherein the pH of said acidic aqueous solution of ammonium nitrate is less than about pH 1.0.

11. The method of claim 1, wherein the temperature of said acidic aqueous solution of ammonium nitrate is below about 130° F.

12. The method of claim 1, wherein each of said acidic aqueous solution of ammonium nitrate and ammoniacal aqueous solution of ammonium nitrate has a concentration of ammonium nitrate of from about 25% to about 50% by weight.

13. The method of claim 1, when said acidic aqueous solution of ammonium nitrate has a free nitric acid content of from about 10% to about 15% by weight.

* * * * *